(12) United States Patent
Zhu

(10) Patent No.: US 11,506,955 B2
(45) Date of Patent: Nov. 22, 2022

(54) PHOTOGRAPHIC EQUIPMENT AND ELECTRICALLY CONTROLLED SLIDING APPARATUS THEREOF

(71) Applicant: ZHONGSHAN DASHAN PHOTOGRAPHIC EQUIPMENT CO., LTD., Zhongshan (CN)

(72) Inventor: Xihua Zhu, Zhongshan (CN)

(73) Assignee: ZHONGSHAN DASHAN PHOTOGRAPHIC EQUIPMENT CO., LTD., Zhongshan (CN)

(*) Notice: Subject to any disclaimer, the term of this patent is extended or adjusted under 35 U.S.C. 154(b) by 0 days.

(21) Appl. No.: 16/831,863

(22) Filed: Mar. 27, 2020

(65) Prior Publication Data

US 2020/0319536 A1 Oct. 8, 2020

(30) Foreign Application Priority Data

Apr. 4, 2019 (CN) ............. 201910272694.7
Sep. 12, 2019 (CN) ............. 201910867376.5

(51) Int. Cl.
*F16M 11/04* (2006.01)
*G03B 17/56* (2021.01)
(Continued)

(52) U.S. Cl.
CPC ......... *G03B 17/561* (2013.01); *F16M 11/043* (2013.01); *F16M 11/06* (2013.01); *F16M 11/18* (2013.01); *H02K 7/116* (2013.01)

(58) Field of Classification Search
CPC .... G03B 17/56; G03B 17/561; G03B 17/566; H02K 7/116; F16M 11/04; F16M 11/041;
(Continued)

(56) References Cited

U.S. PATENT DOCUMENTS

2007/0070198 A1* 3/2007 Vera .............. G08B 13/196
246/166.1
2013/0180615 A1* 7/2013 Ragner ............... F16L 11/112
138/119

(Continued)

FOREIGN PATENT DOCUMENTS

CN 109185617 A * 1/2019

OTHER PUBLICATIONS

Machine Translation of CN109185617; Publication Date: Jan. 11, 2019. (Year: 2019).*

*Primary Examiner* — Clayton E. LaBalle
*Assistant Examiner* — Fang-Chi Chang

(57) ABSTRACT

The present disclosure relates to an electrically controlled sliding apparatus for photographic equipment, comprising: a controlling component, comprising a power supply and a slider controlling component electrically connected with the power supply; a guiding component; and a sliding component electrically connected with the controlling component and slidably mounted on the guiding component, the sliding component comprising: a rotation component for providing rotation movement; wherein the controlling component further comprises a first conducting part electrically connected with the power supply and the sliding component, the controlling component is configured to supply power to the rotation component through the first conducting part, and wherein the first conducting part comprises a first connecting section and a second connecting section respectively connected with the controlling component and the sliding component.

20 Claims, 10 Drawing Sheets

(51) Int. Cl.
*F16M 11/06* (2006.01)
*F16M 11/18* (2006.01)
*H02K 7/116* (2006.01)

(58) Field of Classification Search
CPC .. F16M 11/043; F16M 11/045; F16M 11/048; F16M 11/06; F16M 11/08; F16M 11/16; F16M 11/18; F16M 11/20; F16M 11/2007; F16M 11/2014; F16M 11/2085; F16M 11/2092; F16M 11/22
See application file for complete search history.

(56) References Cited

U.S. PATENT DOCUMENTS

| | | | |
|---|---|---|---|
| 2014/0161434 A1* | 6/2014 | Koymen | F16M 11/18 396/428 |
| 2017/0205688 A1* | 7/2017 | Chapman | G03B 17/561 |
| 2017/0237314 A1* | 8/2017 | Moore | F16H 57/02 475/149 |

* cited by examiner

PHOTOGRAPHIC EQUIPMENT AND ELECTRICALLY CONTROLLED SLIDING APPARATUS THEREOF

TECHNICAL FIELD

The present disclosure relates to the field of photography, video recording, and more particularly to a photographic equipment and an electrically controlled sliding apparatus thereof.

BACKGROUND

An electrically controlled sliding apparatus for photographic equipment is a movable shooting apparatus which is frequently used during shooting, and typically includes a sliding rail, a sliding block and a driving unit for driving a slide of the sliding block. The driving unit drives the sliding block to move a camera fastened on the sliding block in use so that a desired capturing effect is realized. However, there are two types of electrically controlled sliding apparatuses for photographic equipment in the market. One is manually controlled which is difficult to achieve a constant and accurate moving shoot. The other is an electrically driven sliding apparatus, which only provides electrically controlled linear movements without rotation movements, and thus is unable to provide a large shooting range. In addition, such apparatus has a large volume with complex wires and complicated structure.

SUMMARY

The main objective of the present disclosure is to provide a photographic equipment and an electrically controlled sliding apparatus thereof to overcome the above shortcomings.

The present disclosure provides an electrically controlled sliding apparatus for photographic equipment, comprising: a controlling component, comprising a power supply and a slider controlling component electrically connected with the power supply; a guiding component; and a sliding component electrically connected with the controlling component and slidably mounted on the guiding component, the sliding component comprising: a rotation component for providing rotation movement; wherein the controlling component further comprises a first conducting part electrically connected with the power supply and the sliding component, the controlling component is configured to supply power to the rotation component through the first conducting part, and wherein the first conducting part comprises a first connecting section and a second connecting section respectively connected with the controlling component and the sliding component.

In some embodiments, the first conducting part further comprises a conducting body located between the first connecting section and the second connecting section, and the conducting body is curled shaped.

In some embodiments, the conducting body is coiled or helical shaped and extends along a sliding direction of the sliding component.

In some embodiments, a positioning part is provided which passes through the conducting body of the first conducting part to limit a location of the first conducting part.

In some embodiments, the first conducting part comprises a spring wire for transmitting electrical signals between the controlling component and the sliding component.

In some embodiments, the first conducting part further comprises a conducting body located between the first connecting section and the second connecting section, and the conducting body is an electric brush strip, and the second connecting section is configured as an electric brush component slidably contacting the electric brush strip.

In some embodiments, the guiding component comprises two guiding rails, the controlling component further comprises a second conducting part, and the first and second conducting parts are respectively fixed on the two guiding rails, and the second conducting part electrically connects the controlling component with the rotation component and is configured to transmit signals between the rotation component and the controlling component.

In some embodiments, the sliding component further comprises a mounting seat moveably arranged on the two guiding rails and a supporting seat moveably arranged on the two guiding rails.

In some embodiments, the rotation component is arranged in the mounting seat, and the rotation component comprises a rotation controlling module, by means of which the rotation component is electrically connected with the first and the second conducting parts.

In some embodiments, the rotation component comprises a motor controlled by the controlling component and a gear set connected with the motor.

In some embodiments, the gear set comprises a driving gear mounted on a rotation shaft of the motor, a driven gear engaging with outer teeth of the driving gear and a gear ring engaging with outer teeth of the driven gear.

Furthermore, the present disclosure provides a photographic equipment comprising the electrically controlled sliding apparatus for photographic equipment according to the above embodiment, and a camera mounted on the sliding component.

In some embodiments, the first conducting part further comprises a conducting body located between the first connecting section and the second connecting section, and the conducting body is curled shaped.

In some embodiments, the conducting body is coiled or helical shaped and extends along a sliding direction of the sliding component.

In some embodiments, a positioning part is provided which passes through the conducting body of the first conducting part to limit a location of the first conducting part.

In some embodiments, the first conducting part comprises a spring wire for transmitting electrical signals between the controlling component and the sliding component.

In some embodiments, the first conducting part further comprises a conducting body located between the first connecting section and the second connecting section, and the conducting body is an electric brush strip, and the second connecting section is configured as an electric brush component slidably contacting the electric brush strip.

In some embodiments, the guiding component comprises two guiding rails, the controlling component further comprises a second conducting part, and the first and second conducting parts are respectively fixed on the two guiding rails, and the second conducting part electrically connects the controlling component with the rotation component and is configured to transmit signals between the rotation component and the controlling component.

In some embodiments, the sliding component further comprises a mounting seat moveably arranged on the two guiding rails and a supporting seat moveably arranged on the two guiding rails.

In some embodiments, the rotation component is arranged in the mounting seat, and the rotation component comprises a rotation controlling module, by means of which the rotation component is electrically connected with the first and the second conducting parts.

By using the above conductive part, the electrically controlled sliding apparatus for photographic equipment provided by the present disclosure realizes a possibility of uniform power supply of the electrically controlled sliding apparatus avoiding separate power supply for a rotation and displacement, and eliminates complex wires and a fatigue problem of the wires caused by a use for long time.

BRIEF DESCRIPTION OF THE DRAWINGS

The further features of the present disclosure will be apparent from the descriptions of the preferred embodiments which are only provided by means of examples in conjunction with accompanying drawings, wherein.

DESCRIPTION OF THE EMBODIMENTS

The present disclosure will be further described in detail with reference to the accompanying drawings and embodiments so that the objective and the advantages of the present disclosure will be more apparent.

Figure 1:
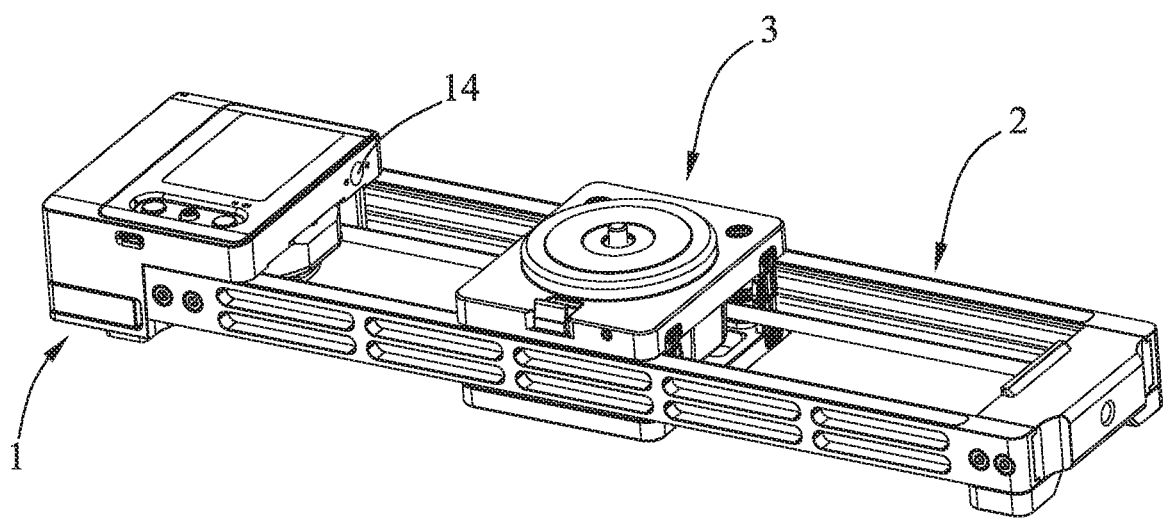
FIG. 1 is a schematic view of an electrically controlled sliding apparatus for photographic equipment according to an embodiment of the present disclosure.

As shown in FIG. 1, an electrically controlled sliding apparatus 100 for photographic equipment according to the present disclosure includes a controlling component 1, a guiding component 2 mounted on a side of the controlling component 1, and a sliding component 3 slidably mounted on the guiding component 2. The guiding component 2 and the sliding component 3 are controlled by the controlling component 1 so that the sliding component 3 can slide on the guiding component 2 and in the meanwhile the sliding component 3 can rotate around its rotating axis.

Figure 2:
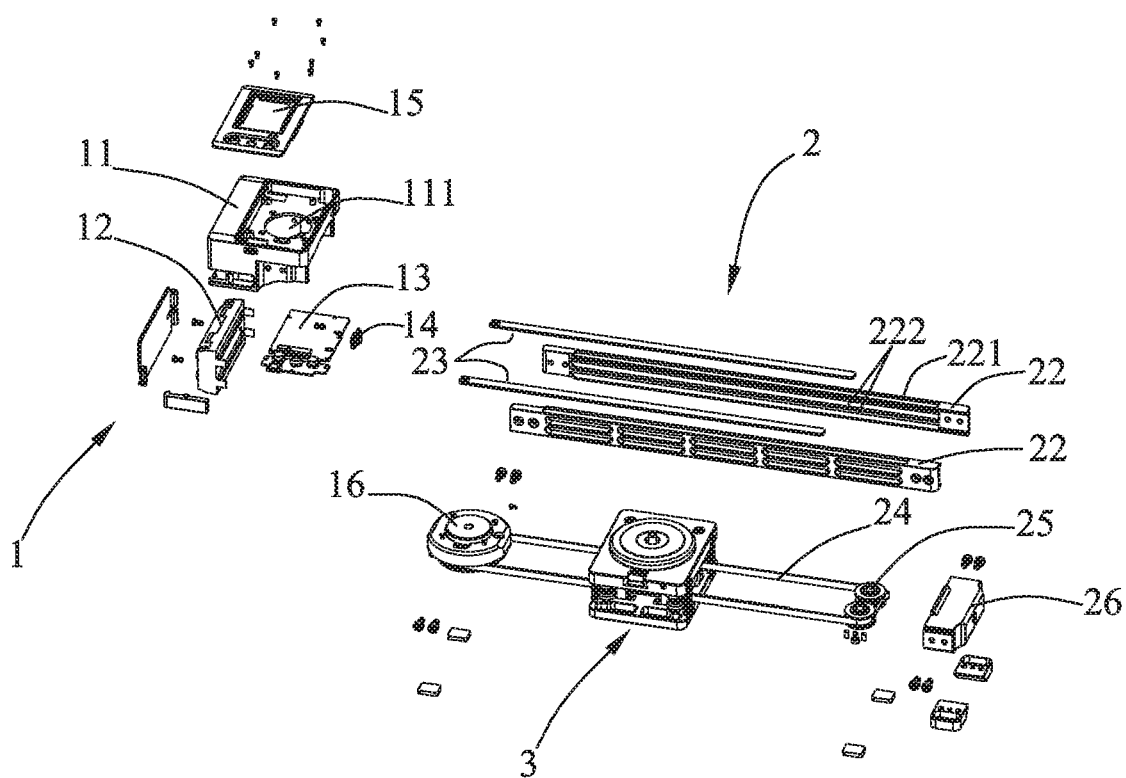
FIG. 2 is a partially exploded view of the electrically controlled sliding apparatus for photographic equipment shown in FIG. 1.
Figure 3:
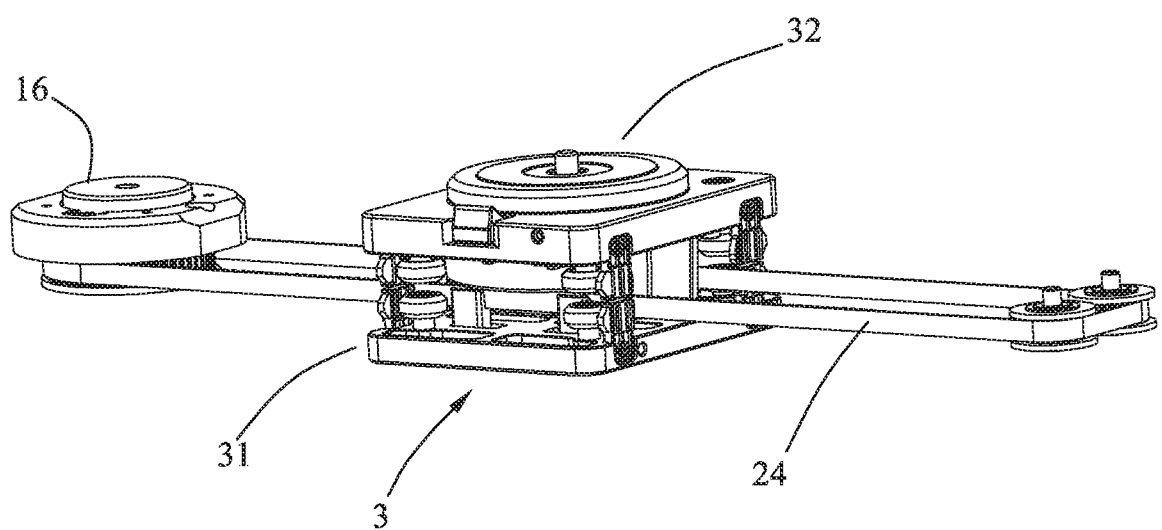
FIG. 3 is a schematic view of a sliding component of the electrically controlled sliding apparatus for photographic equipment shown in FIG. 1, connected with a driving belt and a sliding controlling component.
Figure 4:
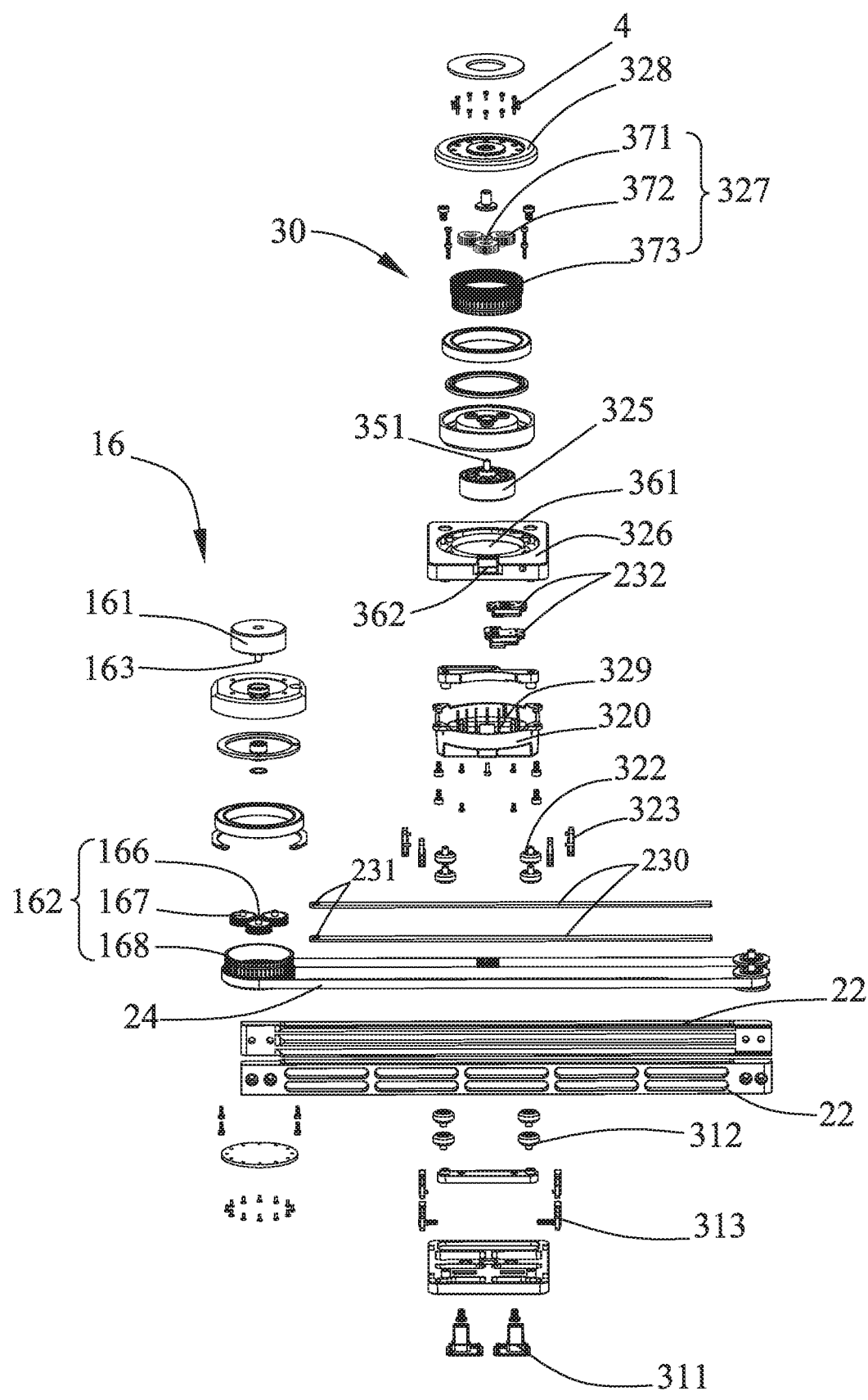
FIG. 4 is a further exploded view of partial components of the electrically controlled sliding apparatus for photographic equipment shown in FIG. 2.

Referring to FIGS. 2 to 4, the controlling component 1 includes a shell 11, a power supply 12 mounted in the shell 11, a controlling module 13 powered by the power supply 12 and a slider controlling component 16 controlled by the controlling module 13. An upper surface of the shell 11 is provided with a control panel 15 electrically connected with the controlling module 13, through which a user can control and check operations of the electrically controlled sliding apparatus 100. The controlling component 1 further includes an infrared module 14 arranged on a side of the shell 11 facing the sliding component 3, which is configured for detecting operating conditions of the sliding component 3. The shell 11 is provided with a first mounting hole 111 adjacent to the control panel 15, for mounting and locating the slider controlling component 16. In this embodiment, the slider controlling component 16 includes a first motor 161 electrically connected with the controlling module 13 and a first gear set 162 connected with the first motor 161. The first gear set 162 includes a first driving gear 166 mounted on a first rotating shaft 163 of the first motor 161, a driven gear 167 engaging with outer teeth of the first driving gear 166 and a first gear ring 168 engaging with outer teeth of the first driven gear 167. In this embodiment, there are three first driven gears 167 in order to provide a stable transmission between the first driving gear 166 and the first driven gears 167. The first gear ring 168 includes a plurality of inner teeth, and preferably, the first gear ring 168 further has outer teeth.

Figure 5:
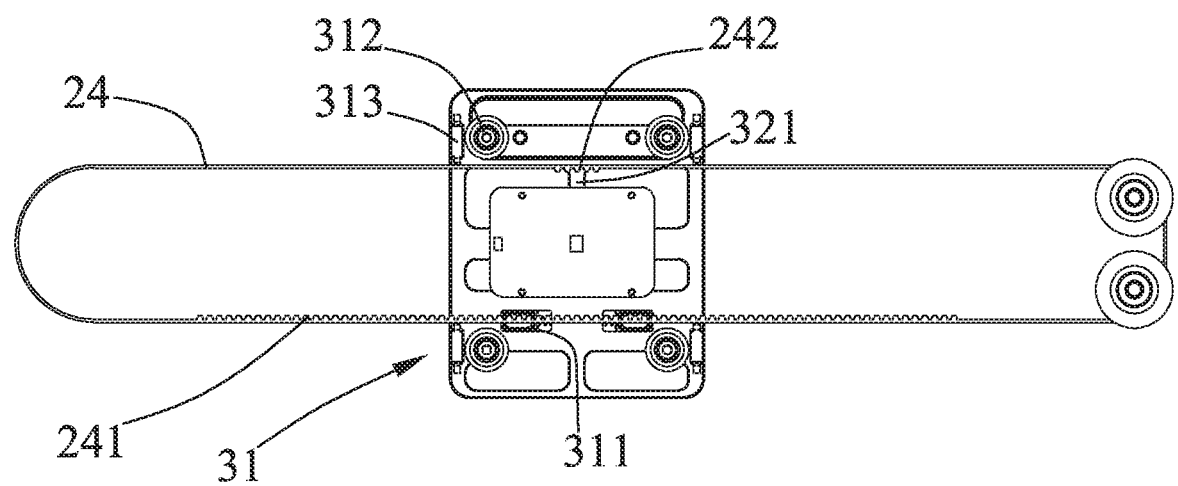
FIG. 5 is a plan view of the sliding component of the electrically controlled sliding apparatus for photographic equipment shown in FIG. 1, connected with the driving belt.
Figure 6:
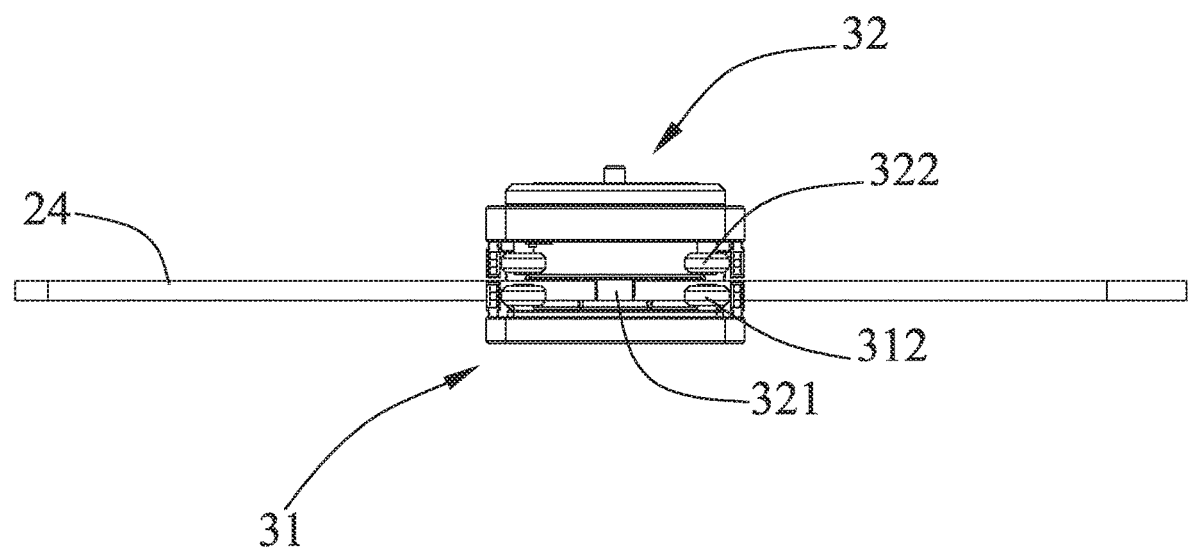
FIG. 6 is an another plan view of the sliding component of the electrically controlled sliding apparatus for photographic equipment shown in FIG. 1, connected with the driving belt.

The guiding component 2 includes at least one guiding rail component 22, a driving belt 24 and a wheel set 25. An end of the guiding rail 22 is fixedly connected to a lateral side of the shell 11 of the controlling component 1. In this embodiment, the at least one guiding rail 22 includes two guiding rails 22 arranged parallel to each other, each guiding rail has two tracks 222 arranged one above another and in parallel. The wheel set 25 is provided on an end of the at least one guiding rail 22 far away from the controlling component 1 and is opposite to the controlling component 1, and is located between two guiding rails 22 in the present embodiment. Referring to FIGS. 4 to 6, the driving belt 24 surrounds a periphery of the first gear ring 168 of the slider controlling component 16 of the controlling component 1 and simultaneously moves with the first gear ring 168 when the first gear ring 168 rotates.

The controlling component 1 further includes two conducting parts 23 for electrically connecting the power supply 12 with the sliding component 3. The controlling component 1 supplies power to a rotation component 30, or receives and transmits electrical signals through the two conducting parts 23. Each of the two conducting parts 23 includes a first connecting section 231 connected with the controlling component 1 and a second connecting section 232 connected with the sliding component 3.

In the first embodiment provided by the present disclosure, Each of the two conducting parts 23 further includes a conducting body 230 which is designed as an electric brush strip for electrically connecting the power supply 12 and the controlling module 13 of the controlling component 1 with the sliding component 3. The two electric brush strips 230 of the controlling component 1 are mounted on the tops of the two guiding rails 22, respectively. An end of each electric brush strip 230 connected to the controlling component 1 is provided with a connecting section 231 for electrically connecting with the controlling module 13 and the power supply 12. In this embodiment, each guiding rail 22 is provided with a locating slot 221 at a top thereof, in which a respective electric brush strip 230 is located so that the respective electric brush strip 230 is avoided from influences by external vibration to improve the stability of the electrical connection between the controlling component 1 and the sliding component 3. Preferably, in order to facilitate the mounting and locating of each electric brush strip 230, the first connecting section 231 is configured as a projection which extends away from the respective guiding rail 22. The power supply 12 can supply power to the sliding component 3 by means of one of the two electric brush strips 230, and the other of the two electric brush strips 230 is configured to transmit signals between the controlling module 13 and the sliding component 3.

The sliding component 3 includes a supporting seat 31 and a mounting seat 32. The mounting seat 32 includes a mounting base 320. The supporting seat 31 and the mounting seat 32 can be respectively driven by two cog-belt sections of the driving belt 24 to move. Depending on a moving direction of the driving belt 24, the supporting seat 31 and the mounting seat 32 can move towards or away from each other. For this purpose, the supporting seat 31 has a first fixing section 311 fixed relative to a first cog-belt section 241 of the driving belt 24, the mounting seat 32 has a second fixing section 321 fixed relative to a second cog-belt section 242 of the driving belt 24, wherein the first fixing section 311 and the second fixing section 321 are arranged parallel to and away from each other. The supporting seat 31 includes a first slider 312 mounted on a side thereof, by means of which the supporting seat 31 is connected with the two guiding rails 22 of the guiding component 2 and is movable relative thereto. In this embodiment, the first slider 312 is configured to be a plurality of wheels to reduce friction and thus is facilitate to the movement of the supporting seat 31 relative to the two guiding rails 22. The mounting seat 32 includes a second slider 322 mounted on a side of the mounting base 320, by means of which the mounting seat 32 is connected to the two guiding rails 22 of the guiding component 2 and is movable relative thereto. In this embodiment, the second slider 322 is provided above the first slider 312. In this embodiment, the first slider 312 is configured to include four wheels, two of which are arranged on the lower track 222 of one guiding rail 22, and the other two of which are arranged on the lower track 222 of the other guiding rail 22. The second slider 322 is configured to include four wheels, two of which is arranged on the upper track of one guiding rail 22, and the other two of which are arranged on the upper track of the other guiding rail 22. Due to the above configuration, the sliding component 3 can smoothly move between the two guiding rails 22. Further, a first dustproof part 313 and a second dustproof part 323 are respectively provided on outer sides of the first slider 312 and the second slider 322 in a direction along the two guiding rails 22 in order to prevent ambient debris which may enter into the sliding component 3 and impact its smooth movements.

Figure 7:
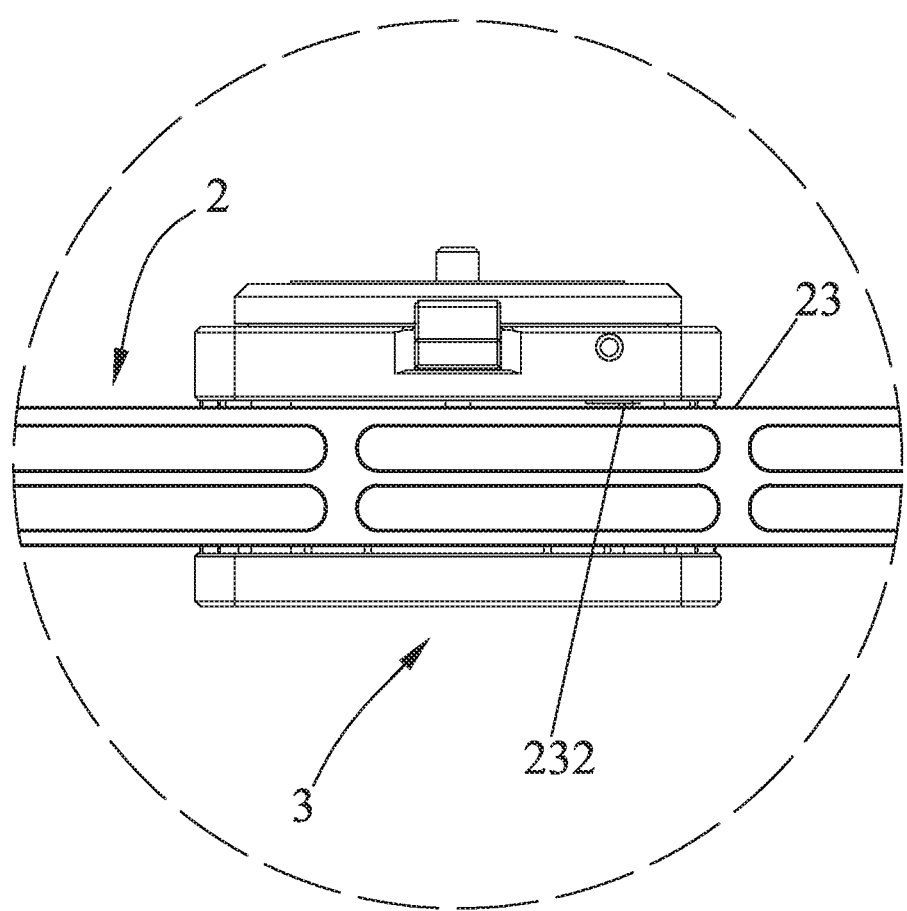
FIG. 7 is a partial enlarged view of the electrically controlled sliding apparatus for photographic equipment shown in FIG. 1.

Referring to FIGS. 4 and 7, the mounting seat 32 further includes a rotation component 30 arranged in the mounting base 320. In this embodiment, the rotation component 30 includes a second motor 325, a second gear set 327 connected with the second motor 325, and a rotation controlling module 329 controlling the second motor 325. The second motor 325 is powered and controlled by the controlling component 1. The mounting seat 32 further includes an end cover 326 which is provided with a second mounting hole 361 at its center. The second gear set 327 is located in the second mounting hole 361. The second gear set 327 includes a second driving gear 371 mounted on a second rotation shaft 351 of the second motor 325, a second driven gear 372 engaging with outer teeth of the second driving gear 371, and a second gear ring 373 engaging with outer teeth of the second driven gear 372. In this embodiment, there are three second driven gears 372 in order to provide a stable transmissions between the second driving gear 371 and the second driven gears 372. The second gear ring 373 has inner teeth. The second gear ring 373 is connected with a connecting seat 328 by a connecting part 4, so that the connecting seat 328 can rotate with the second gear ring 373. A video camera can be mounted on the connecting seat 328. In this embodiment, the connecting part 4 is a screw. Preferably, the rotation controlling module 329 is arranged at a bottom of the mounting seat 32 and configured to control a rotation of the rotation component 30 under the control of the controlling component 1. In this embodiment, the end cover 326 is further provided with a locking button 362 engaging with the outer teeth of the second gear ring 373, so that the rotation component 30 can be locked from rotation when there is no need.

Figure 8:
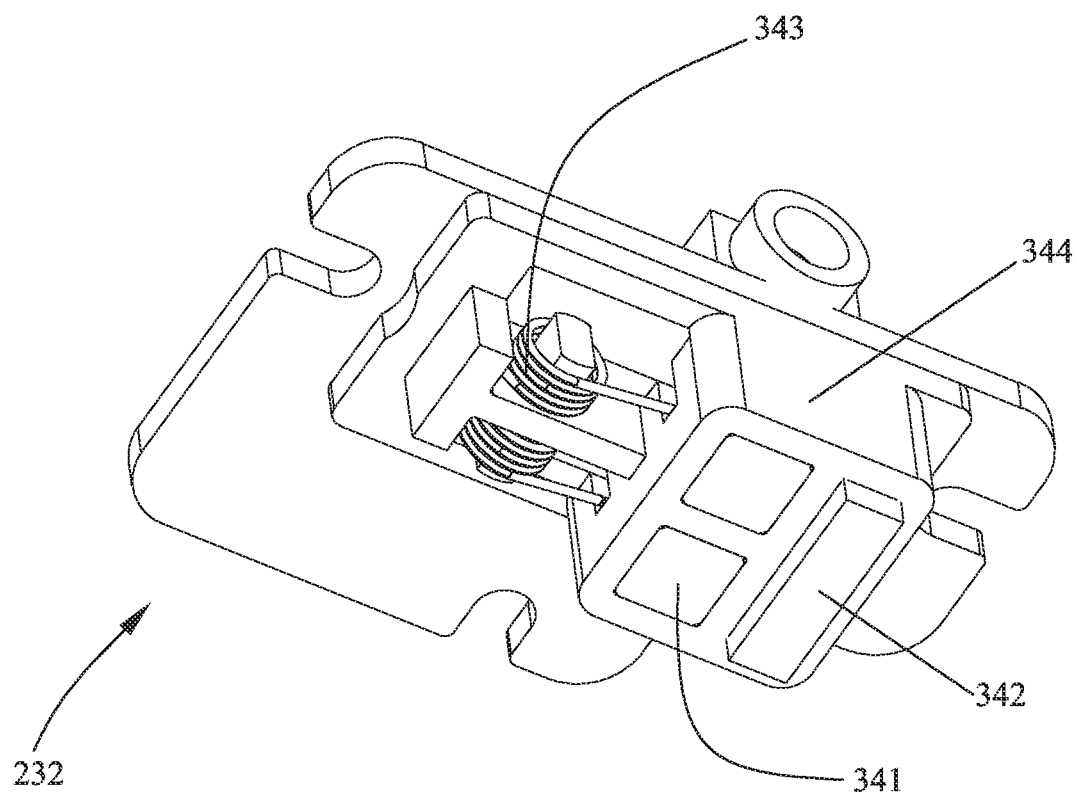
FIG. 8 is a schematic view of an electric brush component of the electrically controlled sliding apparatus for photographic equipment according to an embodiment of the present disclosure.

Referring to FIGS. 4 and 7, the second connecting section 232 of each conducting part 23 is arranged on the rotation component 30 of the mounting seat 32, and contacts the electric brush strip 230 on the guiding component 2 to electrically connect with the controlling component 1. In this embodiment, the second connecting section 232 is configured to be an electric brush component. As shown in FIG. 8, the electric brush component 232 includes an electric brush frame 344, an electric brush 341 mounted on the electric brush frame 344, and a resilient part 343. The elastic part 343 urges the electric brush 341 towards the electric brush strip 230 in order to realize a reliable contact between the electric brush 341 and the electric brush strip 230. In this embodiment, the electric brush component 232 further includes a third dustproof part 342 for protecting the electric brush 341 from ambient environment. The third dustproof part 342 is arranged adjacent to the electric brush 341 along a moving direction of the electric brush 341 in order to prevent ambient debris which may enter to the electric brush component 232 and destroy the reliable contact between the electric brush 341 and the electric brush strip 230.

In this embodiment, the mounting seat 32 is provided with two electric brush components 232, each of which includes two electric brushes 341. These electric brushes 341 are respective a positive electric brush and a negative electric brush, and each electric brush strip 230 correspondingly includes a positive portion and a negative portion. In this embodiment, during operating the electrically controlled sliding apparatus 100, these electric brushes 341 of each electric brush component 232 respectively contact with the positive portion and the negative portion of the corresponding electric brush strip 230 and slide along the corresponding electric brush strip 230 under the control of the controlling component 1 in order to provide power to the mounting seat 32 and transmit signals between the mounting seat 32 and the controlling component 1.

The configuration of the electric brush strip 230 and the electric brush component 232 solves problems about complex wires in traditional electrically controlled sliding apparatuses for photographic equipment, eliminates defects caused by poor contact of connecting wires or by a use for long time and signal delay because of wireless transmission, and even provides a constant and synchronous connection between the controlling component 1 and the sliding component 3, so that a timely and accurate sports photography can be ensured. Moreover, the aesthetic of the electrically controlled sliding apparatus 100 is ensured and user experiences are largely improved. In this embodiment, an infrared module 14 of the controlling component 1 is arranged towards one of these electric brush strips 230 in order to accurately sense operations of the sliding component 3 equipped with a camera.

Figure 9:
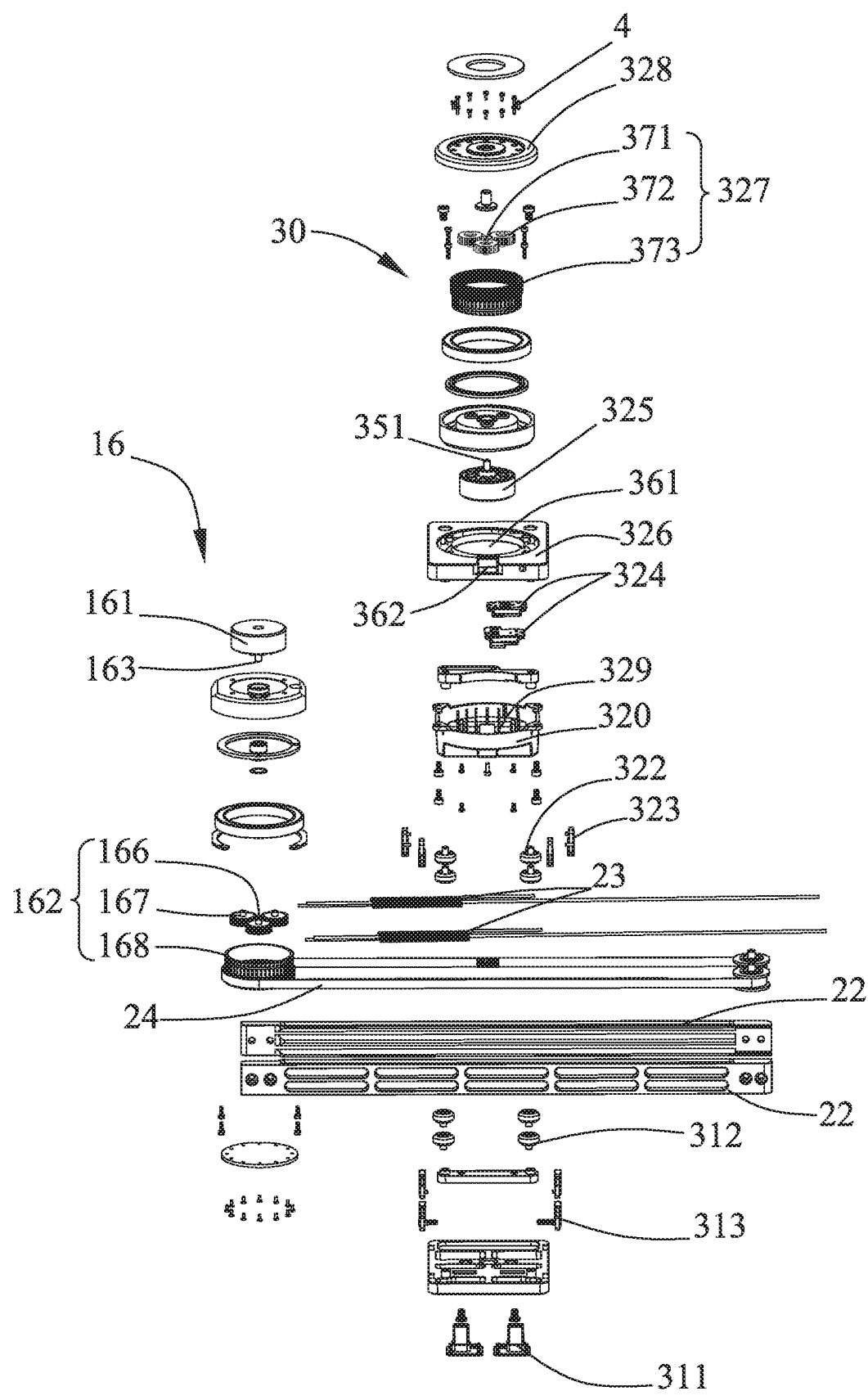
FIG. 9 is similar to FIG. 4, but showing the electrically controlled sliding apparatus of FIG. 1 having two alternative conducting parts.
Figure 10:
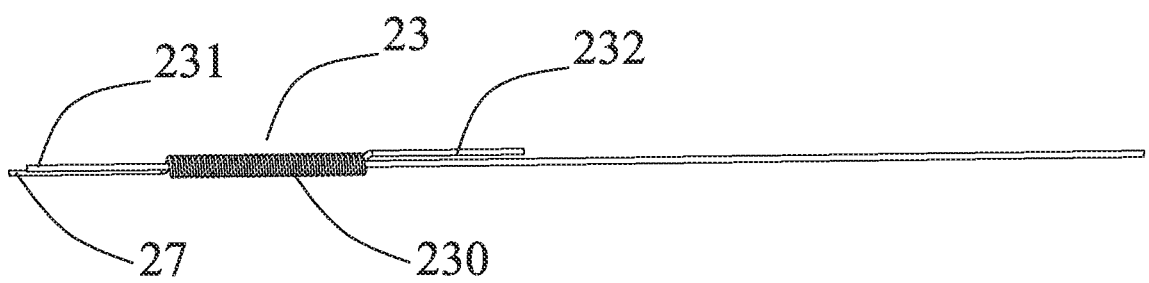
FIG. 10 illustrates the conducting part shown in FIG. 9 more clearly.

FIGS. 9 and 10 show that the electrically controlled sliding apparatus for photographic equipment of FIG. 1 has two alternative conducting parts 23. In particular, as shown in FIG. 10, each conducting part 23 includes a curled conducting body 230, a first connecting section 231 and a second connecting section 232 respectively connected with two ends of the conducting body 230. Preferably, the conducting body 230 is configured to be a coiled or helical structure. Each conducting part 23 is configured to fixedly connected with the controlling component 1 at the first connecting section 231, which, in particular, is configured to be electrically connected with the controlling module 13 and the power supply 12 (referring to FIG. 2). The second connecting section 232 is fixed to the sliding component 3. The first connecting section 231 and the second connecting section 232 can be fixed by means of suitable connecting methods, for example, the first connecting section 231 may be welded, pressed or riveted to the sliding component 3. The conducting body 230 of each conducting part 23 is configured to be coiled or helical. When the sliding component 3 is sliding on the guiding component 2, the helical conducting body 230 is stretched or compressed along its axial direction. Due to such coiled or helical configuration, bending of the conducting body 230 is significantly reduced when it is stretched or compressed so that each conducting part 23 can be prevented from damage caused by its fatigue upon multiple working cycles and thus significantly prolongs service life of the two conducting parts 23. Moreover, the helical conducting body 230 of each conducting part 23 eliminates problems of complex wires. A locating slot 221 is provided on a top end of each guiding rail 22, the two conducting parts 23 are respectively located in the two locating slots 221 so that the two conducting parts 23 can be protected from external vibration, and thus the stability of electrical connection between the controlling component 1 and the sliding component 3 is improved. Preferably, in order to facilitate the mounting and locating of each conducting part 23, the first connecting section 231 and the second connecting section 232 are both configured as fixed ends extending outwardly along opposite axial directions of the conducting body 230. Preferably, each conducting part 23 is a spring wire. The power supply 12 supplies power to the sliding component 3 by means of one of the conducting parts 23, and the other conducting part is configured to transmit signals between the controlling module 13 and the sliding component 3.

Moreover, the rotation component 30 of the mounting seat 32 further includes a fastener 324 for mounting the second connecting section 232 of the conducting part 23 onto the rotation component 30 in order to realize an electrical connection between the rotation component 30 and the controlling component 1. Preferably, the fixing part 324 presses the second connecting section 232 to the rotation component 30 by means of such as, bolt or the like, in order to realize an electrical connection between the rotation controlling module 329 and the two conducting parts 23. During operation of the electrically controlled sliding apparatus 100, the two conducting parts 23 each have two ends respectively fixed on the controlling component 1 and the sliding component 3. One conducting part 23 is configured to supply power to the sliding component 3, and the other conducting part transmits signals between the controlling component 1 and the sliding component 3 under the control of the controlling component 1.

Referring to FIGS. 9 and 10, a positioning part 27 passes through the conducting body 230 of each conducting part 23. The positioning part 27 is fixed in the locating slot 221 of each guiding rail 22. The positioning part 27 facilitates to limit a movement of the conducting body 230 along its axial direction without shift. The positioning part 27 may be flexible (such as a straightened string or the like) or a rod arranged linearly and parallel to each guiding rail 22.

The configuration of each conducting part 23 having the curled conducting body 230 solves problems of complex wires in traditional electrically controlled sliding apparatuses for photographic equipment, eliminates defects caused by poor contact of connecting wires or by a use for long time and signal delay because of wireless transmission, and further provides a constant and synchronous connection between the controlling component 1 and the sliding component 3, so that a timely and accurate sports photography can be ensured. Moreover, the aesthetic of the electrically controlled sliding apparatus 100 is ensured and user experiences are largely improved. In particular, an infrared module 14 of the controlling component 1 is arranged facing towards one of the electric brush strips 230 in order to accurately sense operations of the sliding component 3 equipped with a camera.

The electrically controlled sliding apparatus for photographic equipment provided by the present disclosure has a compact structure, is easy to carry and operate. By using the configuration of the conducting part, the electrically controlled sliding apparatus for photographic equipment provides a possibility of uniform power supply of a electrically controlled sliding apparatus and solves problems of separate power supply of a rotation and movement and in the meanwhile simplifies a structure of the electrically controlled sliding apparatus and eliminates complex wires and a fatigue problem caused by a use for long time. The designs of the electric brush component, the electric brush strip and sliding component make the structure of the electrically controlled sliding apparatus compact, and save a space of the electrically controlled sliding apparatus and in the meanwhile provide a wider capturing range and an easier operation for a user. Moreover, the electrically controlled sliding apparatus for photographic equipment realizes a reliable electrical connection and accurate control between the controlling component and the sliding component.

The above is only preferred embodiments of the present disclosure, and is not intended to limit the present disclosure. Any modifications, equivalent substitutions and improvements made within the spirit and principles of the present disclosure should be included in the scope of protection of the present disclosure.

What is claimed is:

1. An electrically controlled sliding apparatus for photographic equipment, comprising:
   a controlling component, comprising a power supply and a slider controlling component electrically connected with the power supply;
   a guiding component; and
   a sliding component electrically connected with the controlling component and slidably mounted on the guiding component, the sliding component comprising: a rotation component for providing rotation movement;
   wherein the controlling component further comprises a first conducting part electrically connected with the power supply and the sliding component, the controlling component is configured to supply power to the rotation component through the first conducting part, and wherein the first conducting part comprises a first connecting section and a second connecting section respectively connected with the controlling component and the sliding component,
wherein the sliding component further comprises a mounting seat and a supporting seat, which are slidable towards or away from each other along the guiding component, and
wherein the first conducting part comprises a spring wire which comprises a helical shaped portion electrically connected between the controlling component and the sliding component to transmit electrical signals, a length of the helical shaped portion along a sliding direction of the sliding component increases as the mounting seat slides away from the controlling component and decreases as the mounting seat slides towards the controlling component,
wherein the rotation component is arranged in the mounting seat.

2. The electrically controlled sliding apparatus for photographic equipment according to claim 1, wherein a positioning part is provided which passes through the helical shaped portion of the first conducting part to limit a location of the first conducting part.

3. The electrically controlled sliding apparatus for photographic equipment according to claim 1, wherein the guiding component comprises two guiding rails, the controlling component further comprises a second conducting part, and the first and second conducting parts are respectively fixed on the two guiding rails, and the second conducting part electrically connects the controlling component with the rotation component and is configured to transmit signals between the rotation component and the controlling component.

4. The electrically controlled sliding apparatus for photographic equipment according to claim 3, wherein the mounting seat is moveably arranged on the two guiding rails and the supporting seat is moveably arranged on the two guiding rails.

5. The electrically controlled sliding apparatus for photographic equipment according to claim 4, wherein the rotation component comprises a rotation controlling module, by means of which the rotation component is electrically connected with the first and the second conducting parts.

6. The electrically controlled sliding apparatus for photographic equipment according to claim 3, wherein a locating slot is provided on a top end of each guiding rail, the first conducting part and the second conducting part are respectively located in the two locating slots.

7. The electrically controlled sliding apparatus for photographic equipment according to claim 6, wherein the locating slot is provided along a sliding direction of the sliding component.

8. The electrically controlled sliding apparatus for photographic equipment according to claim 6, wherein a positioning part is provided in each of the two locating slots along a sliding direction of the sliding component, the positioning part passes through the helical shaped portion of each of the first and the second conducting parts to limit a location of the first and the second conducting parts.

9. The electrically controlled sliding apparatus for photographic equipment according to claim 3, wherein the two guiding rails are provided parallel to the sliding direction of the sliding component, and the sliding component is positioned between the two guiding rails.

10. The electrically controlled sliding apparatus for photographic equipment according to claim 1, wherein the rotation component comprises a motor controlled by the controlling component and a gear set connected with the motor.

11. The electrically controlled sliding apparatus for photographic equipment according to claim 10, wherein the gear set comprises a driving gear mounted on a rotation shaft of the motor, a driven gear engaging with outer teeth of the driving gear and a gear ring engaging with outer teeth of the driven gear.

12. A photographic equipment comprising the electrically controlled sliding apparatus for photographic equipment according to claim 1, and a camera mounted on the sliding component.

13. The photographic equipment according to claim 12, wherein a positioning part is provided which passes through the helical shaped portion of the first conducting part to limit a location of the first conducting part.

14. The photographic equipment according to claim 12, wherein the guiding component comprises two guiding rails, the controlling component further comprises a second conducting part, and the first and second conducting parts are respectively fixed on the two guiding rails, and the second conducting part electrically connects the controlling component with the rotation component and is configured to transmit signals between the rotation component and the controlling component.

15. The photographic equipment according to claim 14, wherein the rotation component is arranged in the mounting seat, and the rotation component comprises a rotation controlling module, by means of which the rotation component is electrically connected with the first and the second conducting parts.

16. The photographic equipment according to claim 14, wherein a locating slot is provided on a top end of each guiding rail, the first conducting part and the second conducting part are respectively located in the two locating slots.

17. The photographic equipment according to claim 16, wherein the locating slot is provided along a sliding direction of the sliding component.

18. The photographic equipment according to claim 16, wherein a positioning part is provided in each of the two locating slots along a sliding direction of the sliding component, the positioning part passes through the helical shaped portion of each of the first and the second conducting parts to limit a location of the first and the second conducting parts.

19. The photographic equipment according to claim 14, wherein the two guiding rails are provided parallel to the sliding direction of the sliding component, and the sliding component is positioned between the two guiding rails.

20. An electrically controlled sliding apparatus for photographic equipment, comprising:
a controlling component, comprising a power supply and a slider control ling component electrically connected with the power supply;
a guiding component; and
a sliding component electrically connected with the controlling component and slidably mounted on the guiding component, the sliding component comprising: a rotation component for providing rotation movement;
wherein the controlling component further comprises a first conducting part electrically connected with the power supply and the sliding component, the controlling component is configured to supply power to the rotation component through the first conducting part, and wherein the first conducting part comprises a first connecting section and a second connecting section respectively connected with the controlling component and the sliding component, wherein the first conducting part comprises a spring wire which comprises a helical shaped portion electrically connected between the controlling component and the sliding component to transmit electrical signals, a length of the helical shaped portion along a sliding direction of the sliding component increases as the mounting seat slides away from the controlling component and decreases as the mounting seat slides towards the controlling component, wherein the sliding component further comprises a mounting seat and a supporting seat, and wherein the rotation component is arranged in the mounting seat, the rotation component rotates a video camera relative to the mounting seat.

* * * * *